United States Patent [19]

Koerner

[11] Patent Number: 4,823,894

[45] Date of Patent: Apr. 25, 1989

[54] METHOD OF WEIGHING EQUINES

[76] Inventor: Walter J. Koerner, P.O. Box 1022, Bella Vista, Calif. 96008

[21] Appl. No.: 155,071

[22] Filed: Feb. 10, 1988

[51] Int. Cl.⁴ ............................................. G01G 19/40
[52] U.S. Cl. ...................................... 177/25.14; 177/1
[58] Field of Search .......................... 177/25.14, 159, 1

[56] References Cited

U.S. PATENT DOCUMENTS 3,283,838 11/1966 Fetterman et al. .......... 177/25.14 X
4,030,559 6/1977 Fish et al. ............................ 177/159

Primary Examiner—George H. Miller, Jr.

[57] ABSTRACT

A method for obtaining the weight of an equine in which the handler places both equine forefeet, or one forefoot with the handler supporting the other, onto a permanently installed or portable scale which is designed and calibrated to measure the weight bearing on it and indicate to the handler a total equine weight which the scale derives through division of the measured weight by the predetermined percentage of the total family equine weight carried on the forefeet. This percentage factor can be set into the scale as a fixed factor or as an adjustable factor.

6 Claims, 1 Drawing Sheet

METHOD OF WEIGHING EQUINES

BACKGROUND

1. Field of Invention

This invention relates to the care and management of equines, specifically to obtaining the weight of an equine as part of the care and management.

2. Prior Art

Heretofore, the weighing of an equine, for the common horseman, usually required the use of a vehicle weighing scale. The equine was either unloaded from the transport vehicle and led onto the scale or was carried on the scale in a truck or trailer from which a tare had previously been obtained. However, vehicle scales are non-existant in certain regions or not easily accessible to the common horseman, being located in areas of commerce and trucking and requiring, for the horseman's use, much travel and trouble.

A method of approximating the weight of an equine has been used heretofore. This method consists of using a specially marked tape to measure the circumference of an equine's girth. The markings on this tape provided an estimated weight depending on the measured girth circumference. Questions of where to place the tape and how tight to pull the tape make this method an approximation at best.

OBJECTS AND ADVANTAGES

Through the use of this invention, weight can become a known quantity in the care and management of equines.

General knowledge of equine weight can enhance their management and might be critical during purchase negotiations.

Equine medicine is usually given as a prescribed volume per 100 pounds of equine body weight. Through the use of this invention, equine weight guessing can be eliminated and a precise dosage administered. This would be more cost efficient and would delete the effects of under dosing or over dosing.

Use of this invention would permit rates of growth in young equines to be monitored and a weight for age evaluation determined.

Use of this invention would allow periodic weight to be determined and monitored throughout an exercise program or during a special feeding or dieting situation.

Progress of the equine during periods of recovery from surgery or illness can be monitored and controlled through the use of this invention.

Race horse fitness "peaking" would be more easily evidenced through the use of this invention.

DESCRIPTION AND OPERATION OF INVENTION

The body structure of the equine distributes more than 50% of the total weight to the two front feet. This weight distribution is a practical constant throughout the horse family.

This invention uses these facts to permit a method for obtaining the weight of an equine by measuring the weight carried by the two front feet and dividing the weight measured by the predetermined percentage of the total family equine weight carried by the front feet.

This is accomplished through the use of a special scale which is capable of measuring the weight bearing on it and dividing that weight by the predetermined percentage factor and indicating to the handler the total weight of the equine.

There can be several embodiments of this method, including, but not limited to:

The scale being permanently installed.

The Scale being portable.

The known percentage factor of forefeet weight bearing to total equine weight being set into the scale as a fixed factor.

The known percentage factor of the forefeet weight bearing to total equine weight being set into scale as an adjustable factor.

Figure 1:
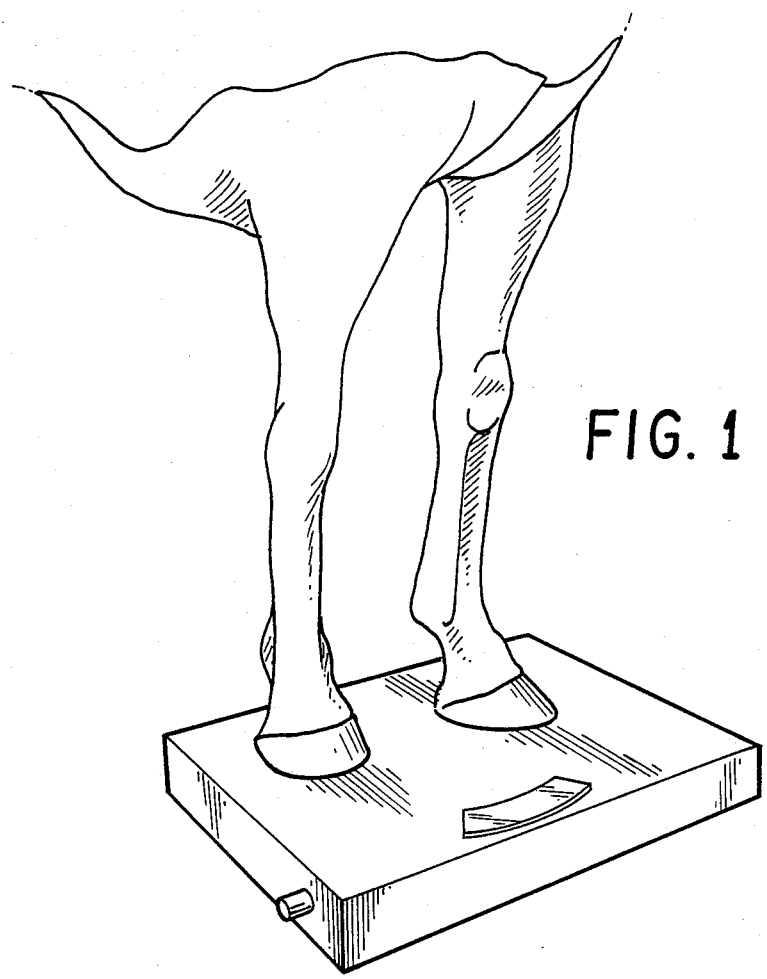
FIG. 1 is a view of weighing an equine by standing both equine forefeet on a scale device.

Both front feet of the equine can be placed on the scale as shown in FIG. 1.

Figure 2:
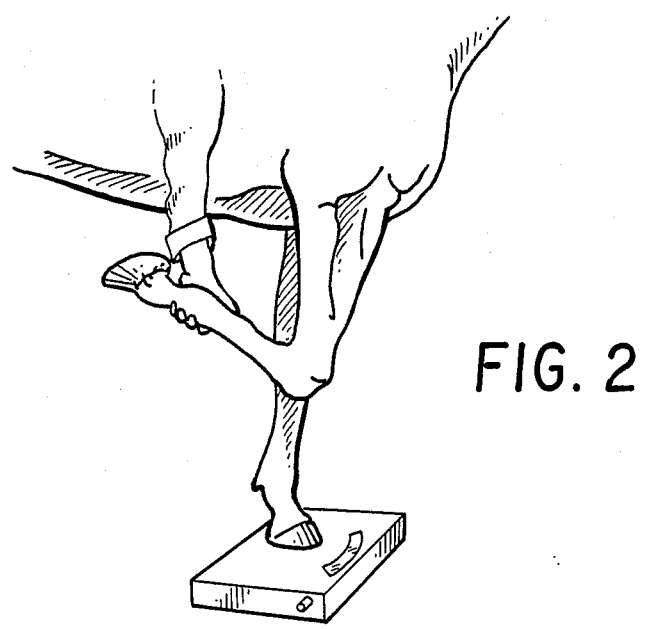
FIG. 2 is a view of the handler weighing an equine by standing one equine forefoot on a scale device and supporting the other forefoot.

One front foot of the equine can be placed on the scale as shown on FIG. 2.

This latter embodiment is the one preferred by the inventor. When one front foot of the equine is placed on the scale and the other front foot is lifted from the ground by the handler the equine will shift it's weight for balance and cause the total front end weight to be transmitted through the foot remaining on the scale, except for the weight of the foot and portion of the lower leg supported by the handler. This weight can be added through calibration to the total equine weight indicated by the scale.

This single foot weighing permits the scale to be smaller and less complicated and therefore less expensive than a scale required for two foot weighing. There is also a steadying effect for an equine causing it to stand still when the handler is holding one forefoot off the ground. This permits the handler more time to observe the scale readout.

I claim:

1. A method of weighing an equine by standing one forefoot of said equine onto a portable scale device with the handler supporting the other said equine forefoot off the ground, said scale device consisting of a load responsive means to measure applied weight and read out means to indicate a weight greater than the said applied weight, said indicated weight being the quotient of the said measured weight divided by a fixed factor, being the predetermined percentage of total family equine weight carried by said family equine forefoot.

2. The method of claim 1 wherein said portable scale device is permanently installed.

3. The method of claim 1 wherein said fixed factor is an adjustable factor.

4. A method of weighing an equine by standing both forefeet of said equine onto a portable scale device consisting of a load responsive means to measure applied weight and read out means to indicate a weight greater than said applied weight, said indicated weight being the quotient of the said measured weight divided by a fixed factor, being the predetermined percentage of total equine weight carried by said family equine forefeet.

5. The method of claim 4 wherein said portable scale device is permanently installed.

6. The method of claim 4 wherein said fixed factor is an adjustable factor.

* * * * *